United States Patent
Emery et al.

(10) Patent No.: US 6,562,120 B2
(45) Date of Patent: May 13, 2003

(54) GRANULAR PIGMENTS

(75) Inventors: Peter Robin Emery, Frampton (GB); Joseph Hugh McAualay, Buckinghamshire (GB); Peter Dunker, Ontario (CA)

(73) Assignee: Elementis UK Limited, London (GB)

( * ) Notice: Subject to any disclaimer, the term of this patent is extended or adjusted under 35 U.S.C. 154(b) by 0 days.

(21) Appl. No.: 10/171,774

(22) Filed: Jun. 17, 2002

(65) Prior Publication Data

US 2003/0066458 A1 Apr. 10, 2003

Related U.S. Application Data

(63) Continuation of application No. 09/530,913, filed as application No. PCT/GB99/02974 on Sep. 8, 1999, now abandoned.

(30) Foreign Application Priority Data

Sep. 8, 1998 (GB) .............................................. 9819591

(51) Int. Cl.[7] .................................................. C09C 1/36
(52) U.S. Cl. ..................... 106/436; 106/453; 23/313 R; 264/118; 264/141
(58) Field of Search ................................ 106/456, 453; 23/313 R; 264/118, 141

(56) References Cited

U.S. PATENT DOCUMENTS

| | | | | |
|---|---|---|---|---|
| 4,670,181 A | * | 6/1987 | Mollinger et al. | 524/317 |
| 5,215,584 A | * | 6/1993 | Buxbaum et al. | 106/712 |
| 5,322,563 A | * | 6/1994 | van Bonn et al. | 106/712 |
| 5,480,626 A | * | 1/1996 | Klasen et al. | 423/449.1 |
| 5,634,970 A | * | 6/1997 | Linde et al. | 106/437 |
| 5,993,526 A | * | 11/1999 | Sommer et al. | 106/31.65 |
| 6,132,505 A | * | 10/2000 | Linde et al. | 106/429 |

FOREIGN PATENT DOCUMENTS

| | | | | |
|---|---|---|---|---|
| DE | 4345168 A1 | * | 11/1994 | C09C/1/58 |
| DE | 19708167 A1 | * | 9/1998 | C08J/3/20 |
| EP | 598318 A1 | * | 5/1994 | B01J/2/14 |
| EP | 803552 A1 | * | 10/1997 | C09D/5/36 |
| GB | 1535807 A1 | * | 12/1978 | |
| WO | WO 98/17731 | * | 4/1998 | |

* cited by examiner

Primary Examiner—C. Melissa Koslow
(74) Attorney, Agent, or Firm—Michael J. Cronin

(57) ABSTRACT

The present invention provides a method for the preparation of pigment granules that are readily dispersible, robust, and have a reduced liability to dusting, preferably without the use of substantial quantities of binder, if any at all. The method comprises mixing at least one pigment selected from the group consisting of iron oxides, chromium oxides, cobalt blues, mixed metal oxides, carbon blacks and titanium oxides, with water to form a mixture having a dough-like consistency. The mixture is then extruded through at least one die to form extruded granules, thereby also compacting the mixture, which increases the strength of the granules. The extruded granules are then dried so that the final water content of the granules is less than substantially 5%.

18 Claims, No Drawings

GRANULAR PIGMENTS

This application is a continuation of application Ser. No. 09/530,913, filed May 8, 2000, now abandoned which is a 371 of PCT/GB99/02974 filed Sep. 8, 1999.

FIELD OF INVENTION

The present invention relates to the manufacture of pigment granules, for example iron oxide and chromium oxide pigments.

BACKGROUND

Metal oxides, such as iron oxides or chromium oxides, are used in the pigmentation of, among other things, cement and concrete products (e.g. paving slabs and blocks), paints, plastics, toners and inks, chelants, catalysts, and also in a variety of magnetic, medical, and pharmaceutical applications. Such metal oxide pigments have traditionally been used in the form of a powder.

Powdered metal oxide pigments, such as iron oxide and chromium oxide pigments, are dusty, giving rise to health hazards and making storage and handling difficult. Also, the powders are not free flowing and so cannot readily be conveyed through pipes, which readily become blocked by the powder; furthermore the poor flowing properties of powders makes it hard to meter them using auger screws to ensure the correct proportion of pigment to base material (e.g. concrete).

Similar problems are known in other industries, e.g. in the animal feedstuff industry, and such problems have been solved to a substantial extent by granulating the product. It is readily apparent that such solutions can be applied to the field of pigments to solve the above problems. For example, it has been proposed in FR-A-2 450 273 to granulate carbon black pigment used in the pigmentation of paper and cement and concrete; here it should be understood that carbon black gives rise to an even greater dusting problem than iron oxides since the granule size of carbon black powders is much smaller than that of iron oxide powders but also carbon black suffers from an additional problem of floating on the base material, which makes incorporation into the base material difficult. According to FR-A-2 450 273, the twin problems of dusting and poor incorporation are solved by mixing carbon black with at least 30% water and optionally also a wetting or dispersing agent in an amount of 0.5 to 12% and preferably 5 to 10% (based on the amount of the carbon black) and subjecting the resulting mixture to compression forces in a pearlising machine to form pearls or granules. Depending on the nature and operation of the pearlising machine, the compression forces can be substantial.

In contrast to FR-A-2 450 273, EP-B-0 268 645 requires that no compression forces are applied to pigments during the formation of pigment granules for use in colouring of concrete and cement. This may be achieved by an agglomeration technique, e.g. by means of rotating pan or drum granulising machines, which merely bring individual pigment particles into contact with each other in the presence of water and a binder (e.g. lignin sulphonate), whereupon the particles adhere to each other, i.e. they coalesce, to form the required granules. Alternatively pigment granules may be formed by spray drying a mixture of the pigment, water and a binder and commercially it is the spray drying method that is used. Both methods, however, require the presence of a considerable amount of binders to ensure that the pigment particles adhere to one another. If made by pan or drum pelletising machines, it may be necessary to dry the granules to a commercially acceptable water content below 4.2% water.

In U.S. Pat. No. 4,277,288, it has been proposed to manufacture pigment granules by forming a fluidised bed of pigment powder and adding into the bed an organic liquid or wax as a binder to promote granulation. A surfactant is also added.

U.S. Pat. No. 5,484,481 discloses a process for the granulation of pigments for use in dyeing cement and concrete involving compacting pigment powders in the presence of a binder to form flakes, breaking up the flakes and pelletising the ground flakes using known techniques, e.g. using rotating pans or drums, which would involve the application of water and a binder to the ground flakes.

However, the granulation of pigments must meet another criterion not required in other industries where pelletisation is common, e.g. the animal feed stuff industry, namely the requirement that any pigment granules must be capable of being readily dispersed in the base material to colour it uniformly since if they did not readily disperse, they would give rise to streaks or pockets of colour, which detract from the appearance of the final product. Thus granules should be able to be dispersed in the base material while at the same time should be sufficiently coherent and robust that they do not break down into powder again during storage or handling.

The manufactures of coatings (whether liquid or dry) require that pigments contain as few unnecessary additives as possible and it would therefore be desirable to be able to produce pigments with substantially reduced amounts of binders and, if possible, even to eliminate such additives.

It has generally been thought indispensable commercially to use one or more binders (other than water or other material that is or can be removed after the formation of the granule) in the manufacture of pigment granules to give the granules strength to resist being broken up into powder during handling and storage and to promote the dispersion of these granules in their end use.

It is an object of the present invention to manufacture pigment granules that both readily disperse in the base medium and also are robust and have a reduced liability to dusting, i.e. to being broken down into powder. It is a further object of the present invention to provide a process of manufacturing robust and readily dispersible pigment granules without the use of substantial quantities of binder.

DISCLOSURE OF THE INVENTION

According to the present invention, there is provided a process for the preparation of low dusting, free flowing granules of at least one pigment, said at least one pigment being selected from the group consisting of iron oxides, chromium oxides, cobalt blues, mixed metal oxides, carbon blacks, titanium oxides, or mixtures thereof, which process comprises mixing said at least one pigment with water to form a mixture having a dough-like consistency, extruding the mixture through at least one die to form extruded granules, thereby also compacting the mixture, and drying the extruded granules, so that the final water content of the granules is less than substantially 5%.

The action of forcing the material through a die during the extrusion process exerts a substantial compaction on the individual pigment particles, thereby increasing the strength of the granules.

Surfactants and/or binders may be added to the extrusion dough, although any binder used is preferably of the type that also has some surfactant properties. Examples of suitable binders/dispersants are Borresperse NA, Ultrazine NA, Pexol 2000, Dresinate 214, Dispex N40, Narlex LD31, Suparex DP CC002. Surfactants (e.g. anti-flocculants or wetting agents), such as sodium alkylbenzene sulphonates, also make suitable additives, as they can provide some incidental binding action, as well as improving the dispersion properties in the end use.

The water content of the dough mixture is critical to:
forming a stable granule
preventing the extruded granules from fusing to one another
producing discrete granules rather than just a long ribbon.
but the optimum water content can readily be determined for any pigment composition by simple trial and error.

The damp mixture is fed to a compression device whereby the mixture is forced through holes in a die, which is preferably a perforated plate or screen. This can be achieved by the action of a screw pushing the mixture through the die or by the action of a moving blade or a roller (or similar pushing device) wiped over the die and thereby compressing the mixture through the die.

Typically the extruder holes would be between 0.3 mm and 4 mn in diameter, but could be smaller or larger.

The extruded granules are dried (e.g. in a tray drier, band dryer, fluidised bed dryer etc) and may then be screened to remove fines and/or oversized granules, which latter can arise either because they are too long or because individual granules have fused together. Both the fines and the oversize can be recycled, although the latter could be mechanically reduced in size and rescreened.

The shape of the granules can be further enhanced by rounding either before or after drying, which would give them a higher impact strength (and therefore a reduced liability to form dust) and a greater ability to flow.

The granules can be obtained in very high yields (e.g. in excess of 95%) and the process can easily be operated continuously and, if appropriate, automated.

The screened dried granules are relatively free of dust and fines, which is not the case with briquetted and spray dried granules. The extruded granules are low dusting, robust and exhibit good controllable flowability and handling properties.

The extruded granules of the present invention have greater impact strength than briquetted granules when made to have similar ability to be redispersed in the end use, e.g. in concrete. Looked at another way, the extruded granules having similar redispersion properties to briquetted granules have a greater impact strength. Thus, in general the redispersion properties and impact strength of the extruded granules are superior to spray dried granules.

The quantity of binder/surfactant used can be very low and indeed it is possible to dispense with such additives altogether, which is extremely advantageous for pigments used in wet or dry coatings industries (e.g. paints), where such additives are highly disadvantageous. This is a distinct advantage over spray dried and briquetted granules, where high levels of binders and/or surfactants are required.

The shear forces exerted and the mechanical energy input for the granule formation (and hence the compaction exerted on the pigment during granule formation) can be adjusted by:
changing the extrusion hole size (the larger the diameter, the lower the shear)
changing the extrusion speed, (e.g. the speed of the wiper blade/roller or the feed screw (the slower the speed, the lower the shear).

The compaction exerted on the pigment during granule formation brought about by the shear force and mechanical energy input during extrusion will determine the granules' redispersion and strength properties and hence by suitably setting these parameters during the manufacture of the extruded granules, the properties of the granules can be adjusted to match their intended end use. For example, in uses where redistribution is not a problem, high shear forces can be used during manufacture, which will mean that the granules will have high impact strengths and a low propensity to form dust during storage and handling. However, where easy redistribution properties are required, low shear forces should be used, but this will also make the granules less strong.

DETAILED DESCRIPTION OF THE INVENTION

The invention will be illustrated by a number of non-limiting Examples. In the Examples, the percentages stated are by weight based on the weight of the pigment used.

In the present Examples, granules were subjected to various tests which were all conducted in the same manner:
Yield Test The granules were screened and the percentage of granules produced having a diameter in the range 0.5–2.4 mm was measured together with the percentage of oversized granules having a diameter greater than 2.4 mm.
Flow Rate Test The time taken for 100 g of granules to flow through a funnel having a 15 mm diameter aperture from a static start was measured.
Drop Strength A sample of granules is sieved to remove fines (which are, except when specified otherwise, <0.5 mm) and the granules were then dropped from a height of 750 mm onto a steel plate tilted at an angle of 45 degrees. The dropped sample is then sieved again and the fines (<0.5 mm) generated by the drop are expressed as a percentage of the total sample weight. Hence the lower the fines generation figure, the higher the granule/granule impact strength.
Colour Shift (Delta E)

The colour shift displayed by a concrete brick made using the granular pigment as compared to a standard brick made using the original pigment powder was measured. The target Delta E should be less than 2.
Bulk Density The bulk density of granules is measured by taking a known volume of granules in a bottle and weighing the bottle. The weight of the bottle is subtracted and the bulk density can then be calculated expressed as g/cc.
Dispersion Test A weighed sample of material is stirred at a fixed rate in water for a fixed time, e.g. 3 grams in 225 cc of water, stirred for 5 mins using a 50 mm straight bladed turbine laboratory mixer at 1720 rpm (tip speed 4.5 m/s). The resulting slurry is then wet sieved through a 63 micron screen and the retained residue is dried, weighed and expressed as a percentage of the initial sample weight. The lower the residue figure, the more easily the material will disperse in the end use.

EXAMPLE 1

Manufacture of extruded granules of iron oxide pigments.

A test rig was set up using a perforated plate with 4 mm holes. Pigment paste was compressed through the holes using a hand roller with the extruded granules being collected in a tray beneath the perforated plate. These extruded granules were then dried in a laboratory oven.

The pigment paste was made by placing iron oxide pigment in a 0.5 litre tub and mixing it with soda ash to adjust the pH (0.8% soda ash was used for yellow and red iron oxides and 0.4% for black iron oxide). The yellow iron oxide pigment was YB3100, the red RB2500 and the black BK5500.

Ultrazine NA (sodium lignosulphonate) was dissolved in a small quantity of water as a binder and surfactant. Some dispersant, Dispex N40 was also added to this water, which was then mixed in with the pigment. Further water was added until a malleable pigment dough was formed, which was suitable for extrusion.

Yellow Iron Oxide

Run 1—Binder 2%; Dispersant 3%; Water 33%

The paste had a tendency to produce stringy granules but generally extruded well. The granules surface was too wet and extruded strings readily re-fused back together again as a mass. The dried granules appeared extremely hard with a very shiny surface.

Run 2—Binder 0.75%; Dispersant 1.5%; Water 36%

Paste still had a tendency to produce stringy granules and the extruded granules had a wet surface with some re-fusing occurring. Dried granules were hard.

Run 3—Binder 0.25%; Dispersant 0%; Water 40%

Paste no longer produced stringy granules and the surface of the extruded granules was fairly dry. The dried granules seemed very soft.

Run 4—Binder 0.75%; Dispersant 0.5%; Water 38% Good dough, which extruded well.

Dried granules looked stable and reasonably hard. Run 4 produced the most satisfactory result. The granules dispersed easily under the water tap.

Run 5—Binder 0%; Dispersant 0.5%; Water 46%. Good dough, which extruded well.

Dried granules surface very rough and fractured. Although the granules held their shape well, they disintegrated fairly easily and were deemed too soft at the time.

Black Iron Oxide
  Binder 0.75%; Dispersant 0.5%; Water 23%
  Granules looked very good.
Red Iron Oxide
  Binder 0.75%; Dispersant 0.5%; Water 20.5%
  Paste produced granules that were slightly stringy and the paste was difficult to compress through the extruder plate. Some surface wetness was evident on the granules. The granules looked hard, but they had a satin gloss finish.

The granules from the various runs were subjected to the following tests:

Yellow Granules
Drop Test (Fines<1.18 mm)
  Run 4 2.1%—(showing good impact strength)
  Run 5 5.8%
Dispersion Test
  Run 1 41%
  Run 2 30%
  Run 3 30%
  Run 4 30%
  Run 5 6%
Black Granules
  Dispersion Test 63%
Red Granules
  Dispersion Test 67%

It appears to be a relatively straightforward process to produce extruded iron oxide granules, providing the level of additives (water, dispersant and binder) are optimised. The level of additives is low compared to granulation processes.

The level of water addition appears to be critical to achieve the right dough texture for extruding and hence obtain stable granules, minimise re-fusing of the extruded granules and provide discrete short granules rather than long strings but this can be optimised by simple trial and error.

EXAMPLE 2

Tests were conducted to produce extruded granules of iron oxide pigments of 2 mm diameter using a commercial basket extruder.

2.5 kgs each of yellow, red and black iron oxide (YB3100, RB2500 & BK5500 respectively) were mixed with soda ash for pH adjustment and then with water, Ultrazine NA (sodium lignosulphonate, as a binder) and Suparex DP CCOO2 (as a dispersant) in the amounts set out in Table 1. The resulting dough was extruded using a commercially available basket extruder obtainable form, e.g. Russell Finex Ltd to produce 2 mm diameter granules. Table 1 also sets out the results of the tests conducted on those granules:

TABLE 1

|  | Yellow | Red | Black |
| --- | --- | --- | --- |
| Water addition | 29% | 17% | 18% |
| Ultrazine NA | 0.75% | 1.0% | 0.75% |
| Suparex | 0.5% | 0.5% | 0.5% |
| Bulk density g/cc | 0.83 | 1.20 | 1.04 |
| Flow Test | 4.5 sec | 3.5 sec | 4 sec |
| Drop Test: |  |  |  |
| Fines <0.5 mm | 1.2% | 1.3% | 1.5% |
| Fines <0.3 mm | 0.6% | 0.7% | 0.8% |
| Dispersion Test | 70% | 70% | 65% |
| Colour Shift Delta E |  | 6.36 |  |

The 2 mm extruded iron oxide granules produced on the basket extruder displayed good strength and flow properties but gave poor dispersion test results of well over the 50% level. The latter problem was illustrated by a brick made with the red granules showing a large colour shift compared to the powder control brick with the Delta E well over the expected 2 limit; red spots were also visible in the brick.

EXAMPLE 3

A series of experiments were performed to optimise extruded granules of iron oxide pigments for their end use dispersion property.

The same test rig as used in Example 1 was set up but using a perforated plate with 3 mm holes. Pigment paste was compressed through the holes using a hand roller with the extruded granules being collected in a tray beneath the perforated plate. These extruded granules were then dried in a laboratory oven.

Iron oxide powder (Yellow iron oxide YB3100; Red iron oxide RB2500; Black iron oxide BK5500) were mixed with soda ash to adjust pH.

Water and the following dispersants and wetting agents were used to form the extrusion dough in amounts set out in Table 2:

Dispersants
  Dispex N40 (Dis)
  Suparex DP CCOO2 (Sup)
  Narlex LD3 1 (Nar)

Wetting Agents
- Ethylan BCP (Et1)
- Surfinol 104-S (Sur)
- Arylan SY30 (Ary)
- Ethylan BCD 42 (Et2)
- Lankropol K02 (Lan)

The granules were subjected to drop tests and dispersion tests and the results are given in Table 2, 3 and 4:

TABLE 2

YELLOW

| Additives | Water | Drop Test <1.18 mm | <0.3 mm | Dispersion >0.63 mm |
|---|---|---|---|---|
| Nil | 42% | 7.8% | 2.1% | 18% |
| Dis 0.5% | 39% | 6.3% | 1.6% | 20% |
| Dis 0.75% | 39% | 5.3% | 1.4% | 24% |
| Dis 1% | 36% | 3.2% | 0.8% | 18% |
| Dis 1% | 37% | 3.8% | 0.9% | 18% |
| Dis 1.25% | 37% | 3.0% | 0.8% | 26% |
| Dis 1.5% | 35% | 1.5% | 0.4% | 47% |
| Nar 0.8% | 39% | 4.1% | 1.1% | 32% |
| Nar 1.25% | 37% | 2.8% | 0.7% | 45% |
| Sup 0.25% | 41% | 6.4% | 1.6% | 26% |
| Sup 0.5% | 41% | 4.0% | 1.1% | 21% |
| Sup 0.75% | 39% | 4.9% | 1.2% | 33% |
| Sup 1% | 38% | 4.8% | 1.1% | 37% |
| Sup 0.5% + Et1 0.025% | 40% | 6.3% | 1.5% | 30% |
| Sup 0.5% + Sur 0.025% | 40% | 4.3% | 1.2% | 20% |
| Sup 0.5% + Ary 0.025% | 41% | 3.9% | 1.0% | 11% |
| Sup 0.5% + Et2 0.025% | 41% | 3.4% | 0.8% | 16% |
| Sup 0.5% + Lan 0.025% | 41% | 4.9% | 1.0% | 17% |
| Ary 0.025% | 43% | 3.4% | 0.8% | 6% |

TABLE 3

RED

| Additives | Water | Drop Test <1.18 mm | <0.3 mm | Dispersion >0.63 mm |
|---|---|---|---|---|
| Nil | 21% | 10.6% | 3.1% | 40% |
| Nar 0.8% | 19% | 7.3% | 1.9% | 55% |
| Sup 0.5% | 20% | 6.3% | 1.7% | 42% |
| Sup 0.5% + Sur 0.025% | 20% | 7.7% | 2.3% | 41% |
| Sup 0.5% + Ary 0.025% | 21% | 5.3% | 1.6% | 40% |
| Sup 0.5% + Et2 0.025% | 21% | 5.2% | 1.6% | 47% |
| Sup 0.5% + Lan 0.025% | 21% | 5.3% | 1.6% | 48% |
| Ary 0.025% | 21% | 8.4% | 2.4% | 37% |

TABLE 4

BLACK

| Additives | Water | Drop Test <1.18 mm | <0.3 mm | Dispersion >0.63 mm |
|---|---|---|---|---|
| Nil | 23% | 5.8% | 1.8% | 48% |
| Nar 0.8% | 21% | 4.2% | 1.2% | 53% |
| Sup 0.5% | 21% | 3.8% | 1.1% | 49% |
| Sup 0.5% + Sur 0.025% | 22% | 4.4% | 1.4% | 37% |
| Sup 0.5% + Ary 0.025% | 22% | 5.3% | 1.6% | 35% |
| Sup 0.5% + Ary 0.025% | 22% | 3.2% | 1.0% | 32% |
| Sup 0.5% + Ary 0.075% | 21% | 5.5% | 1.6% | 44% |
| Sup 0.5% + Et2 0.025% | 22% | 3.0% | 1.0% | 42% |
| Sup 0.5% + Lan 0.025% | 22% | 4.1% | 1.3% | 50% |
| Ary 0.025% | 23% | 6.8% | 2.1% | 31% |
| Ary 0.250% | 23% | 6.0% | 1.8% | 42% |

Yellow

The yellow granules show an increase in strength and less favourable dispersion as the dispersant addition increases. However at 1% for Dispex and 0.5% for Suparex, the dispersion property improves close to the virgin granule dispersion, but the granule strength is greater. A small addition of wetting agent can improve the dispersion further as with 0.5% Suparex plus 250 ppm Lankropol K02, Ethylan BCD 42 or Arylan SY30, the latter giving the best result; 250 ppm addition of Arylan SY30 alone was found to give the best all-round result for a 3 mm granule with good granule strength and very good redispersion.

Red

Less improvement achieved on the higher virgin dispersion result, although 0.5% Suparex plus 250 ppm Arylan SY30 produced the same dispersion with a stronger granule. 250 ppm Arylan SY30 alone provided some redispersion improvement, but at the cost of some granule strength.

Black 0.5% Suparex plus 250 ppm Arylan SY30 gave a definite improvement in redispersion with some improvement in granule strength, but increasing this Arylan level from 250 ppm to 750 ppm produced a less favourable dispersion result. There appears to be a definite optimum to the wetting agent addition level. Similarly 250 ppm Arylan alone gave a much improved dispersion result, which deteriorated at the 2500 ppm level.

EXAMPLE 4

Extruded granules of iron oxide pigments of 2 mm diameter were made using a commercial basket extruder and utilizing wetting agents to improve granule dispersion.

The same basket extruder was used as in Example 2.

2.5 kgs of yellow or 3.5 kgs of red or black iron oxide (YB3100, RB2500 & BK5500 respectively) were pre-mixed with soda ash for pH adjustment in a sigma blade mixer and water plus additives applied to give a compressible mixture suitable as a feed to the basket extruder. The extruded granules were dried in a fluidized bed dryer and bagged up for later analysis. The dispersant used was Suparex DP CCOO2 and the wetting agent was Arylan SY30. A second wetting agent Arylan 5BC25 was also examined on red and black granules. The results are given in Table 5:

TABLE 5

| Additives | Water | Drop Test <0.3 mm | Dispersion <0.63 mm | Flow Test Sec | B.D. g/cc |
|---|---|---|---|---|---|
| YELLOW | | | | | |
| 0.5% Sup + 0.025% ArSY30 | 29% | 0.8% | 61% | 3–3.5 | 0.84 |
| 0.5% Sup + 0.025% ArSY30 | 31% | 0.4% | 59% | 3.5–4 | 0.92 |
| 0.025% Arylan SY30 | 29% | 0.5% | 29% | 4 | 0.91 |
| RED | | | | | |
| 0.5% Sup + 0.025% ArSY30 | 18% | 1.0% | 61% | –3 sec | 1.25 |
| 0.025% Arylan SY30 | 18% | 1.0% | 50% | 3 sec | 1.27 |
| 0.025% ArylanSBC2S | 18% | 2.2% | 59% | +3 sec | 1.22 |
| BLACK | | | | | |
| 0.5% Sup + 0.025% ArSY30 | 20% | 0.8% | 48% | 3.5 sec | 1.27 |
| 0.025% Arylan SY30 | 21% | 0.5% | 40% | 3.5 sec | 1.31 |

TABLE 5-continued

| Additives | Water | Drop Test <0.3 mm | Dispersion <0.63 mm | Flow Test Sec | B.D. g/cc |
|---|---|---|---|---|---|
| 0.025% ArylanSBC2S | 20% | 0.5% | 45% | 3 sec | 1.30 |
| Brick Delta E on the 0.025% Arylan SY30 samples | | | | | |
| Yellow | 1.34 | | | | |
| Red | 1.29 | | | | |
| Black | 1.63 | | | | |

The 2 mm extruded iron oxide granules produced on the basket extruder using 250 ppm Arylan SY30 wetting agent displayed good strength and flow properties and showed a good improvement in their dispersion test results. This improvement was reflected in the brick colours which all exhibited a Delta E of less than 2 when compared to a powder control brick.

The basket extruder with 2 mm holes had exerted more shear on the material than the hand test rig with 3 mm holes (Example 3). Hence for the same additives and additive levels there had been a decrease in the dispersion property and an increase in the granule strength.

EXAMPLE 5

Various alternative wetting agents were investigated in laboratory-produced 3 mm extruded iron oxide granules with regard to end use dispersion.

The same test rig as in Example 3 was used having a perforated plate with 3 mm holes. Pigment paste was compressed through the holes using a hand roller with the extruded granules being collected in a tray beneath the perforated plate. The extruded granules were then dried in a laboratory oven.

Red or black iron oxide (RB2500 & BK5500 respectively) were mixed with soda ash for pH adjustment and water and wetting agents (in amounts set out in Table 6) applied to give a compressible mixture:

The wetting agents tried were:

Monolan PC

Ethylan GEO8

Ethylan CPG66O

Arylan SBC2S

Arylan SY30/Monolan PC mix (MaR)

The granules were tested for drop strength and dispersion and the results set out in Table 6:

TABLE 6

| | | Drop Test | | Dispersion |
|---|---|---|---|---|
| Additives | Water | <1.18 mm | <0.3 mm | >0.63 mm |
| BLACK | | | | |
| 0.025% Monolan PC | 24% | 8.2% | 2.9% | 30% |
| 0.1% Monolan PC | 22% | 6.6% | 2.4% | 45% |
| 0.025% Ethylan GEO8 | 24% | 9.2% | 3.1% | 36% |
| 0.1% Ethylan GEO8 | 23% | 5.6% | 2.0% | 51% |
| 0.025% Ethylan CPG66O | 24% | 5.7% | 2.0% | 37% |
| 0.1% Ethylan CPG66O | | 5.2% | 2.0% | 44% |
| 0.025% Arylan SBC2S | 24% | 6.6% | 2.4% | 35% |
| 0.1% Arylan SBC2S | 23% | 6.0% | 2.2% | 58% |
| 0.025% & 0.025% MaR | 23% | 5.2% | 1.9% | 34% |

TABLE 6-continued

| | | Drop Test | | Dispersion |
|---|---|---|---|---|
| Additives | Water | <1.18 mm | <0.3 mm | >0.63 mm |
| 0.01% & 0.01% MaR | 24% | 5.5% | 1.7% | 33% |
| NIL | 23% | 5.8% | 1.8% | 48% |
| 0.025% Arylan SY30 | 23% | 6.8% | 2.1% | 31% |
| RED | | | | |
| 0.025% Monolan PC | 25% | 11.9% | 3.4% | 34% |
| 0.01% & 0.01% MaR | 23% | 12.7% | 3.8% | 35% |
| NIL | 21% | 10.6% | 3.1% | 40% |
| 0.025% Arylan SY30 | 21% | 8.4% | 2.4% | 37%) |

Monolan PC (a glycerol based ethylene oxide—propylene oxide co-polymer) at 250 ppm provided a similar dispersion performance in black iron oxide extruded granules as Arylan SY30 (a sodium alkylbenzene sulphonate). At 1000 ppm the dispersion performance was less favourable.

The Monolan PC provided some improvement in the red iron oxide extruded granules compared to Arylan SY30, but at the expense of some granule strength.

Monolan PC is a non-ionic surfactant whilst Arylan SY30 is anionic.

EXAMPLE 6

Drop tests and dispersion tests were conducted to compare extruded granules of iron oxide pigments made by the present invention with commercially available spray-dried and briquetted granule products. The bulk density of the granules was also measured.

SD=spray dried granules

BR=briquetted granules

EG=extruded granules

Yellow Iron Oxide

| Granule Type | Dispersion residue | Drop fines <0.3 mm | Bulk density g/cc |
|---|---|---|---|
| Silo 49 | SD | 74% | 6.3% | 0.88 |
| Bayer 920G | SD | 33% | 5.4% | 0.62 |
| Bayer 920C | BR | 16% | 2.9% | 0.79 |
| 4 mm granules with 0.75% UltrazNA + 0.5% DispX | EG | 30% | | |
| 4 mm granules with 0.5% DispX | EG | 6% | | |
| 3 mm granules with no additives | EG | 18% | 2.1% | |
| 3 mm granules with 0.5% SupX + 250 ppm ArylanSY3O | EG | 11% | 1.0% | |
| 3 mm granules with 250 ppm ArylanSY3O | EG | 6% | 0.8% | |
| 2 mm granules with 0.5% SupX + 250 ppm ArylanSY3O | EG | 60% | 0.6% | 0.88 |
| 2 mm granules with 250 ppm ArylanSY3O | EG | 29% | 0.5% | 0.91 |

Red Iron Oxide

| | Granule Type | Dispersion residue | Drop fines <0.3 mm | Bulk density g/cc |
|---|---|---|---|---|
| Silo 212 | SD | 53%-frothy | 7.1% | 1.22 |
| Bayer 110G | SD | 87% | | |
| Bayer 130C | BR | 31%-v.frothy | | |
| Bayer 130C | BR | 37%-v.frothy | | |
| Bayer 110C | BR | 38%-v.frothy | 2.7% | 1.16 |
| 3 mm granules with no additives | EG | 40% | 3.1% | |
| 3 mm granules with 0.5% SupX + 250 ppm ArylanSY3O | EG | 40% | 1.6% | |
| 3 mm granules with 250 ppm ArylanSY3O | EG | 37% | 2.4% | |
| 3mm granules with 250 ppm Monolan PC | EG | 34% | 3.4% | |
| 2 mm granules with 0.5% SupX + 250 ppm Arylan SY3O | EG | 61% | 1.0% | 1.25 |
| 2 mm granules with 250 ppm Arylan SY3O | EG | 50% | 1.0% | 1.27 |

Black Iron Oxide

| | Granule Type | Dispersion residue | Drop fines <0.3 mm | Bulk density g/cc |
|---|---|---|---|---|
| Silo 77 | SD | 91% | 14.4% | 1.20 |
| Bayer 33OG | SD | 72% | | |
| Bayer 33OC | BR | 34%-v.frothy | 6.3% | 1.23 |
| 3 mm granules with no additives | EG | 48% | 1.8% | |
| 3 mm granules with 0.5% SupX + 250 ppm Arylan SY3O | EG | 33% | 1.3% | |
| 3 mm granules with 250 ppm Arylan SY3O | EG | 31% | 2.1% | |
| 3mm granules with 250 ppm Monolan PC | EG | 30% | 2.9% | |
| 2 mm granules with 0.5% SupX + 250 ppm Arylan SY3O | EG | 48% | 0.8% | 1.27 |
| 2 mm granules with 250 ppm Arylan SY3O | EG | 40% | 0.5% | 1.31 |

Although throughout the description and in the specific examples only iron oxide and chromium oxide pigments are mentioned, the invention nevertheless encompasses the use of other pigments such as cobalt blues, mixed metal oxides, carbon blacks, and titanium oxides.

Furthermore, while specific examples refer to binders and/or surfactants with the active agent as described, other binders and surfactants may also be anticipated within the scope of the invention; put more generally, the invention encompasses the use of binders and/or surfactants comprising at least one material selected from the group consisting of stearates, acetates, alkyphenols, cellulosics, lignins, acrylics, epoxies, urethanes, sulphates, phosphates, formaldehyde condensates, silicates, silanes, siloxanes, and titanates.

What is claimed is:

1. A process for the preparation of low dusting, free flowing granules of iron oxide or chromium oxide for pigmenting cement or concrete, comprising:
   mixing iron oxide or chromium oxide and at least one of binder that has some surfactant properties with water to form a mixture;
   extruding the mixture through at least one die, thereby compacting the mixture to form extruded granules; and
   drying the extruded granules so that a final water content of the extruded granules is less than about 5 weight %.

2. A process as claimed in claim 1, wherein the weight of the at least one binder is from 0.001 to 10% by weight based on the iron oxide or chromium oxide.

3. A process as claimed in claim 1, wherein the at least one binder comprises at least one material selected from the group consisting of stearates, acetates, alkyphenols, cellulosics lignins, acrylics, epoxies, urethanes, sulphates, phosphates, formaldehyde condensates, silicates, silanes, siloxanes, titanates, and mixtures thereof.

4. A process as claimed in claim 1, wherein the at least one binder comprises at least one material selected from the group consisting of lignin sulphonate, polyacrylates, a salt of naphthalene sulphonate formaldehyde condensate which contains polycarboxylate, a salt of rosin size, a salt of disproportionated rosin, acetylenic diol on non-metallic oxide, sodium alkylbenzene sulphonate, nonyl phenol-ethylene oxide condensates, glycerol-based ethylene oxide-proylene oxide co-polymers, and di-octyl sulphosuccinates.

5. A process as claimed in claim 1, wherein the extruded granules have a diameter in a range of 0.1 to 20 mm.

6. A process as claimed in claim 1, wherein the extruded granules have a diameter in a range of 0.1 to 10 mm.

7. A process as claimed in claim 1, wherein the extruded granules have a diameter in a range of 0.5 to 4 mm.

8. A process as claimed in claim 1, further comprising rounding the extruded granules before said drying.

9. A process as claimed in claim 1, further comprising screening the dry extruded granules to remove an undersize and an oversize fraction.

10. A process as claimed in claim 9, further comprising incorporating the screened out undersize and oversize fractions into the mixture and extruding again.

11. A process as claimed in claim 9, further comprising mechanically comminuting the granules in the screened out oversize fraction.

12. A process according to claim 1, wherein a water content in the mixture is from 18–25% weight.

13. Compacted iron oxide or chromium oxide granules having a diameter in a range of 0.1 to 20 mm made by a process as claimed in claim 1.

14. A process for the preparation of low dusting, free flowing granules of iron oxide or chromium oxide for pigmenting cement or concrete, consisting of:
   mixing iron oxide or chromium oxide with water and at least one binder that has some surfactant properties to form a mixture;
   extruding the mixture through at least one die, thereby compacting the mixture to form extruded granules; and
   drying the extruded granules so that a final water content of the extruded granules is less than about 5 weight %.

15. A process for the preparation of low dusting, free flowing granules of iron oxide or chromium oxide for pigmenting cement or concrete, comprising:
   mixing iron oxide or chromium oxide and at least one binder that has some surfactant properties with water to form a mixture;

extruding the mixture through at least one die, thereby compacting the mixture to form extruded granules, without subjecting the granules to rounding; and drying the extruded granules so that a final water content of the extruded granules is less than about 5 weight %.

16. A process for the preparation of low dusting, free flowing granules of iron oxide for pigmenting cement or concrete, comprising:

mixing iron oxide or chromium oxide and at least one binder that has some surfactant properties with water to form a mixture;

extruding the mixture through at least one die, thereby compacting the mixture to form extruded granules;

drying the extruded granules so that a final water content of the extruded granules is less than about 5 weight %;

screening the dry extruded granules to remove an undersize and an oversize fraction; and recycling the undersize and oversize fractions into the mixture and extruding again.

17. A method for coloring cement or concrete, comprising:

mixing iron oxide or chromium oxide with at least one binder that has some surfactant properties with water to form a mixture;

extruding the mixture through at least one die, thereby compacting the mixture to form extruded granules;

drying the extruded granules so that a final water content of the extruded granules is less than about 5 weight %; and dispersing the granules into a cement or concrete base material.

18. A process according to claim 17, wherein the mixing comprises mixing iron oxide with water to form a mixture and the extruded granules are iron oxide granules.

* * * * *

UNITED STATES PATENT AND TRADEMARK OFFICE
CERTIFICATE OF CORRECTION

PATENT NO. : 6,562,120 B2
DATED : May 13, 2003
INVENTOR(S) : Peter Robin Emery et al.

It is certified that error appears in the above-identified patent and that said Letters Patent is hereby corrected as shown below:

Title page,
Item [75], Inventors, change "Dunker" to -- Duncker --.

Signed and Sealed this

Eighteenth Day of May, 2004

JON W. DUDAS
*Acting Director of the United States Patent and Trademark Office*